United States Patent Office 3,379,736
Patented Apr. 23, 1968

3,379,736
2-SUBSTITUTED-4-METHYLENE-1,3-DIOXOLANES AND PROCESS THEREFOR
Heinz J. Dietrich, Bethany, Robert J. Raynor, North Branford, and Joseph V. Karabinos, Orange, Conn., assignors to Olin Mathieson Chemical Corporation, New Haven, Conn., a corporation of Virginia
No Drawing. Filed June 28, 1965, Ser. No. 467,706
9 Claims. (Cl. 260—340.9)

This invention relates to selected 2-substituted-4-methylene-1,3-dioxolanes, and more specifically it relates to compounds having the following general formulae:

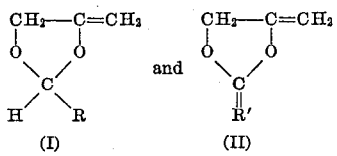

wherein R is chlorinated methyl and R' is methylene or chlorinated methylene.

The preparation of 4-methylene-1,3-dioxolanes containing either hydrogen or alkyl on the 2-carbon atom has been previously described by Fischer et al. in Chem. Ber., 63B, 1732 (1930). However the preparation of 4-methylene-1,3-dioxolanes having a methylene, a chlorinated methylene, or a chlorinated alkyl group in the 2-position has not previously been accomplished.

The principal object of this invention is to provide the heretofore unknown chlorinated 4-methylene-1,3-dioxolanes (I). Another object of this invention is to provide an efficient process for the preparation of the compounds (I) in high purity. Still another object of this invention is to provide the dienes (II) from the chlorinated derivatives (I).

These objects have been accomplished in accordance with the invention disclosed herein.

It has now been found that 2-substituted-4-methylene-1,3-dioxolanes of the general Formula I can be provided in high yield and purity by the reaction of 2-chlorinated methyl-4-chloromethyl-1,3-dioxolanes with selected bases in accordance with the following equation.

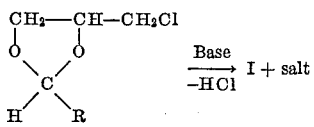

The successful preparation of the chlorinated 4-methylene-1,3-dioxolanes by the method illustrated in the above equation is an unexpected feature of this invention. It is known, as for example disclosed by McElvain et al., J. Am. Chem. Soc., 70, 3781 (1948), that 2-methylene-1,3-dioxolanes are obtained very readily by treating the corresponding halogenated cyclic acetals with a base wherein dehydrohalogenation occurs in the 2-position, and it had been heretofore assumed that 1,3-dioxolanes having chloromethyl substituents in the 2- and 4-positions would preferentially dehydrochlorinate in the 2-position. However surprisingly this does not occur, and hydrogen chloride is instead first removed in the 4-position wherein the derivatives (I) are provided.

Thus the compounds (I) are prepared by adding a powdered alkali metal or alkaline earth metal hydroxide to the 2-chlorinated methyl-4-chloromethyl-1,3-dioxolanes wherein the removal of hydrogen chloride is achieved to provide a methylene group in the 4-position. The formed inorganic salt is conveniently removed from the reaction mixture, and the desired derivatives (I) are then isolated by fractionally distilling the filtrate. However preferred practice involves the use of a solvent, since the addition of powdered base to the reaction system must otherwise be performed very slowly. Solvents which may be advantageously utilized are alcohols such as methanol, ethanol, octanol and the like and glycols such as mono-and diethylene glycols. Preferably the base is dissolved in the same solvent and added to a stirred solution of the 2-chlorinated methyl-4-chloromethyl-1,3-dioxolanes. The resulting inorganic salt is filtered from solution leaving a solution which may be fractionally distilled to obtain the desired product. It has been found that the derivatives (I) are advantageously prepared at a reaction temperature range of about 0°–125° C.

The chlorinated 4-methylene-1,3-dioxolanes (I) are susceptible to further dehydrochlorination in the presence of selected bases whereby the dienes (II) are obtained. Basically similar reaction conditions are employed in this procedure as were noted above for the preparation of the chlorinated derivatives (I) except that more intense conditions are utilized such as the presence of more base, longer reaction times and higher temperatures. Thus for example, the formation of the dienes is more readily achieved by performing the dehydrochlorinations at reaction temperatures up to 180°–200° C. Alternatively the reaction can be performed at lower temperatures by prolonging the reaction period to 18–24 hours.

An alternate process for preparing the chlorinated 4-methylene-1,3-dioxolanes (I) has also been provided. It has been found that these derivatives are also obtained when propargyl alcohol is reacted with selected chloroaldehydes in accordance with the following equation wherein R is as previously represented.

$$\text{RCHO} + \text{CH} \equiv \text{CCH}_2\text{OH} \longrightarrow \text{I}$$

The first step in the above process involves the formation of a hemi-acetal which is subsequently converted to the chlorinated derivatives. The process requires the use of a catalyst, and it has been found that mercuric oxides and salts such as mercuric sulfate, mercuric acetate and mercuric oxide are suitably employed in the preparations. No solvent or diluent is required in the practice of this process.

The reaction is conveniently performed by reacting stoichiometric quantities of the propargyl alcohol with the selected aldehyde in the presence of the required catalyst at a temperature of at least 75° C. A preferred reaction temperature range of 90°–115° C. is employed, since higher temperatures require the use of pressure equipment although the desired product can still be prepared. The required catalyst may be employed in an amount of from about 0.5% to 10% by weight based on total reactant charge, although a preferred catalyst concentration of 1.5–4.0% is suitably utilized.

The following examples will serve to illustrate the preparation of the novel derivatives disclosed herein.

Example 1

A two liter, three-necked flask equipped with a thermometer was charged with 229 g. (1.50 moles) chloroacetaldehyde diethyl acetal, 166 g. (1.50 moles) glycerol-α-monochlorohydrin, 5.0 g. paratoluene sulfonic acid, and 500 ml. benzene. The mixture was distilled slowly to remove the benzene-ethanol azeotrope (B.P. 68° C.). When removal of the ethanol was complete, as indicated by the reflux of pure benzene (B.P. 80° C.), the reaction mixture was cooled to room temperature, washed with a dilute aqueous solution of sodium bicarbonate until neutral, and dried over anhydrous magnesium sulfate. The mixture was fractionally distilled, and a fraction boiling at 117° C./18 mm. amounting to 190 g. (74%) was isolated. Nuclear magnetic resonance spectroscopy identified the colorless liquid as 2,4-bischloromethyl-1,3-dioxolane, $n_D^{25}$ 1.4746.

Example 2

In equipment similar to that described in Example 1 was charged 331.5 g. (3.0 moles) glycerol-α-monochlorohydrin which was then treated dropwise with 339 g. (3.0 moles) of dichloroacetaldehyde. When the heat of reaction had subsided, 330 ml. of concentrated sulfuric acid was added slowly at 70° C., and the entire mixture then was heated at 80° C. for four hours. It was then poured into an ice-water mixture and the resulting water-insoluble layer was separated by extraction with 1.4 liter of chloroform. The chloroform solution was neutralized with sodium bicarbonate, filtered, stripped of chloroform and the residue distilled at reduced pressure. A colorless liquid boiling at 65° C./0.3 mm. in the amount of 414 g. (67%) was isolated. Nuclear magnetic resonance spectroscopy indicated that 2-dichloromethyl-4-chloromethyl-1,3-dioxolane had been obtained, $n_D^{25}$ 1.4930.

Example 3

A 500 ml. three-necked flask equipped with a thermometer, a dropping funnel, a condenser, a stirrer and a nitrogen inlet, was charged with a solution of 51.3 g. (0.30 mole) 2,4-bischloromethyl-1,3-dioxolane in 100 ml. ethyl alcohol. The nitrogen blanketed dioxolane solution was heated to 79°-80° C. and a solution of 21.1 g. (0.32 mole) of 85% KOH in 60 ml. of 90% ethanol was added dropwise at 80° C. over a period of 2⅓ hours. The mixture was then allowed to reflux at 80°-81° C. for an additional one hour, cooled to room temperature, and treated with carbon dioxide until it was neutral. The potassium salts were separated by filtration, and the filtrate stripped and distilled through an efficient column taking care to expose the mixture to air as little as possible. A fraction boiling at 80° C./42 mm. in the amount of 13.8 g. was obtained, $n_D^{25}$ 1.4665. A total of 23.7 g. of the starting 2,4-bischloromethyl-1,3-dioxolane was recovered. The following analytical data revealed that 2-chloromethyl-4-methylene-1,3-dioxolane had been obtained. Yield: 63.8%.

Analysis.—Calcd. for $C_5H_7ClO_2$: C, 44.6; H, 5.2; Cl, 26.4. Found: C, 44.81; H, 5.31; Cl, 26.1.

Example 4

In equipment similar to that described in Example 3 was charged a solution of 61.65 g. (0.30 mole) 2-dichloromethyl-4-chloromethyl-1,3-dioxolane in 100 ml. ethanol. The nitrogen blanketed dioxolane solution was heated to 79° C. and a solution of 21.1 g. (0.32 mole) 85% KOH in 60 ml. of 90% ethanol was added dropwise at 79°-82° C. over a period of 1 hour 35 minutes. The mixture was then allowed to reflux an additional one hour. The reaction mixture was cooled to room temperature and processed as in Example 3. A fraction boiling at 94° C./31 mm. in the amount of 25.0 g. was obtained, $n_D^{25}$ 1.4814. A total of 21.0 g. of the starting 2-dichloromethyl-4-chloromethyl-1,3-dioxolane was recovered. The following analytical data revealed that 2-dichloromethyl-4-methylene-1,3-dioxolane had been obtained. Yield: 74.5%.

Analysis.—Calcd. for $C_5H_6Cl_2O_2$: C, 35.5; H, 3.55; Cl, 42.00. Found: C, 34.41; H, 3.85; Cl, 39.4.

Example 5

2-trichloromethyl-4-chloromethyl-1,3-dioxolane was prepared in 80% yield by the reaction of glycerol-α-monochlorohydrin with chloral in the same manner as described in Example 2. It is a colorless liquid boiling at 129°-133° C./14 mm., $n_D^{25}$ 1.5007.

A solution of 240 g. (1.0 mole) of 2-trichloromethyl-4-chloromethyl-1,3-dioxolane in 150 ml. diethylene glycol was treated dropwise with a solution of 66 g. (1.0 mole) 85% potassium hydroxide in 250 ml. diethylene glycol at 100° C. and at 10-13 mm. pressure. During the addition (50 minutes) all the materials which were volatile at this temperature and pressure (134 g.) were distilled overhead and collected in a Dry Ice cooled receiver. The distillate separated into two layers. The lower layer was fractionally distilled through an efficient column to yield 25.8 g. of 2-trichloromethyl-4-methylene-1,3-dioxolane boiling at 76° C./10 mm., $n_D^{25}$ 1.4958. A total of 38.2 g. of unreacted 2-trichloromethyl-4-chloromethyl-1,3-dioxolane was recovered. Nuclear magnetic resonance and mass spectroscopy confirmed the structure of 2-trichloromethyl-4-methylene-1,3-dioxolane.

Example 6

A 500 ml. three-necked flask equipped with stirrer, thermometer, condenser, and nitrogen inlet was charged with a solution of 18.1 g. (0.27 mole) 85% potassium hydroxide in 50.0 ml. ethylene glycol. The temperature of this mixture was maintained at 60° C. while 60 g. (0.25 mole) 2 - trichloromethyl - 4 - chloromethyl-1,3-dioxolane was added over a period of 5 minutes. The nitrogen blanketed and agitated reaction mixture was heated to 80° C. and maintained at that temperature for 18 hours. It was then distilled at reduced pressure through a short unpacked column. The distillate boiling below 100° C./13 mm. separated into two layers. The lower layer was redistilled through an efficient column to yield 9.0 g. (39%) of a colorless liquid which boiled at 83°-87° C./10 mm., M.P. 48°-49.2° C. The following analytical data revealed that 2 - dichloromethylene-4-methylene-1,3-dioxolane had been obtained.

Analysis.—Calcd. for $C_5H_4Cl_2O_2$: C, 36.00; H, 2.40; Cl, 42.50. Found: C, 35.91; H, 2.51; Cl, 42.45.

Example 7

A one liter, three-necked reaction flask equipped with thermometer, stirrer, and dropping funnel was charged with 56 g. (1.0 mole) of propargyl alcohol. A total of 147 g. (1.0 mole) of chloral was then added dropwise to the alcohol. When the heat of hemiacetal formation had subsided, the mixture was heated at 100° C. for 15 minutes, and then the reaction mixture was cooled to 45° C. A 6.4 g. sample of yellow mercuric oxide was added, and the mixture was stirred and heated under a nitrogen blanket at 116° C. for 2 hours and 40 minutes. The reaction mixture was then cooled to room temperature, filtered, and the filtrate was distilled yielding 111 g. (55%) of 2-trichloromethyl - 4 - methylene-1,3-dioxolane (B.P. 69°-70° C./7 mm.) $n_D^{25}$ 1.4958.

The 4-methylene-1,3-dioxolane derivatives (I) and (II) have a number of valuable applications.

For instance, they are useful agricultural chemicals. In this area, they are particularly effective as nematocides especially in controlling the root knot nematode. These derivatives have also exhibited effectiveness as herbicides against a variety of weed species when applied in post-emergence treatment.

The novel compounds of this invention have special utility as monomer intermediates. Under the influence of selected cationic or Lewis acid type catalysts, the derivatives (I) undergo polymer formation via the carbon double bond at the 4-position to form polyvinylidene polymers which are colorless, transparent and high melting. The resulting polymers are film forming, have enhanced flame resisting properties and have superior hydrolytic stability when compared with other polymers containing acetal bonds, i.e., polyvinylbutyrals.

For instance, 2-trichloromethyl - 4 - methylene - 1,3-dioxolane is polymerized by the addition of small amounts of methanolic solution of either tin tetrachloride or bismuth trichloride at ambient temperature to form a transparent, colorless polymer having a softening temperature of 200°-215° C. which is soluble in most common organic solvents. It readily forms a transparent film when cast from solution. This film exhibits marked resistance to deterioration by flame, and this is undoubtedly due to the high chlorine content of over 50%. Moreover the film is not degraded even when exposed to a hot dilute mineral acid solution in alcohol or water.

The dienes (II) also can be polymerized in a similar manner, and the polymers thus obtained are characterized by increased solvent resistance because of the extensive cross linking achieved. The dienes are valuable cross linking agents, since they readily copolymerize with other vinyl monomers to provide copolymers having increased solvent resistance and surface hardness.

What is claimed is:

1. 2-substituted - 4 - methylene - 1,3 - dioxolanes selected from the class consisting of compounds having the formula

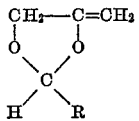

R being chlorinated methyl; and compounds having the formula

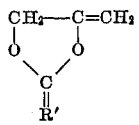

wherein R' is chlorinated methylene.

2. 2-substituted - 4 - methylene - 1,3 - dioxolanes having the formula

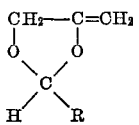

R being chlorinated methyl.

3. 2-chloromethyl-4-methylene-1,3-dioxolane.
4. 2-dichloromethyl-4-methylene-1,3-dioxolane.
5. 2-trichloromethyl-4-methylene-1,3-dioxolane.
6. 2-substituted - 4 - methylene - 1,3 - dioxolanes having the formula

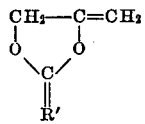

R' being chlorinated methylene.

7. 2-dichloromethylene - 4 - methylene - 1,3-dioxolane.

8. A process for preparing 4-methylene-1,3-dioxolanes of the formula

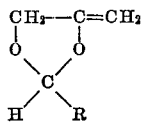

wherein R represents chlorinated methyl, which comprises reacting an aldehyde of the formula RCHO with propargyl alcohol at a temperature of at least 75° C. in the presence of a catalytic amount of mercuric oxide.

9. The process of claim 8 wherein a reaction temperature range of 90°–115° C. is employed.

References Cited

UNITED STATES PATENTS 2,415,638    2/1947    Kenyon et al. _____ 260—88.3 X

OTHER REFERENCES

Yasnitskii et al., Zh. Obshich Khim., vol. 34, No. 6, 1964, pp. 1953–1957.

Yasnitskii et al., Zh. Obshich. Khim., vol. 34(6), 1964, pp. 1940–1945.

NICHOLAS S. RIZZO, *Primary Examiner.*

J. H. TURNIPSEED, *Assistant Examiner.*